United States Patent
Barkan

(10) Patent No.: US 7,428,999 B2
(45) Date of Patent: Sep. 30, 2008

(54) MEMS-BASED ELECTRO-OPTICAL READER AND METHOD WITH EXTENDED WORKING RANGE

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/541,256

(22) Filed: Sep. 29, 2006

(65) Prior Publication Data

US 2008/0197198 A1    Aug. 21, 2008

(51) Int. Cl.
*G06K 7/10* (2006.01)
(52) U.S. Cl. ............. 235/472.01; 235/454; 235/462.01; 235/462.27; 235/462.36; 235/462.45; 359/298
(58) Field of Classification Search .................. 235/462, 235/454, 462.01, 462.27, 462.36, 462.45, 235/472.01; 359/298
See application file for complete search history.

(56) References Cited

U.S. PATENT DOCUMENTS

| | | | | |
|---|---|---|---|---|
| 5,446,272 A | * | 8/1995 | Barkan | 235/454 |
| 5,828,050 A | * | 10/1998 | Barkan | 235/462.27 |
| 6,155,490 A | * | 12/2000 | Ackley | 235/472.01 |
| 2003/0062422 A1 | * | 4/2003 | Fateley et al. | 235/494 |
| 2004/0245338 A1 | * | 12/2004 | Poloniewicz | 235/454 |

\* cited by examiner

*Primary Examiner*—Steven S Paik
*Assistant Examiner*—Tuyen K Vo
(74) *Attorney, Agent, or Firm*—Kirschstein, et al.

(57) ABSTRACT

A MEMS-based reader has an extended range of working distances for reading bar code symbols. A digitizer resolves the edges of bar code symbols when located at far-away distances from the reader within the working range. The digitizer includes a differentiator for differentiating the analog signal to generate a first derivative signal, a peak detector for detecting voltage peaks in the first derivative signal, and a comparator for comparing voltage drops after the voltage peaks with a predetermined voltage value, and for determining the presence of each edge when each voltage drop at least equals, and preferably exceeds, the predetermined voltage value.

16 Claims, 4 Drawing Sheets

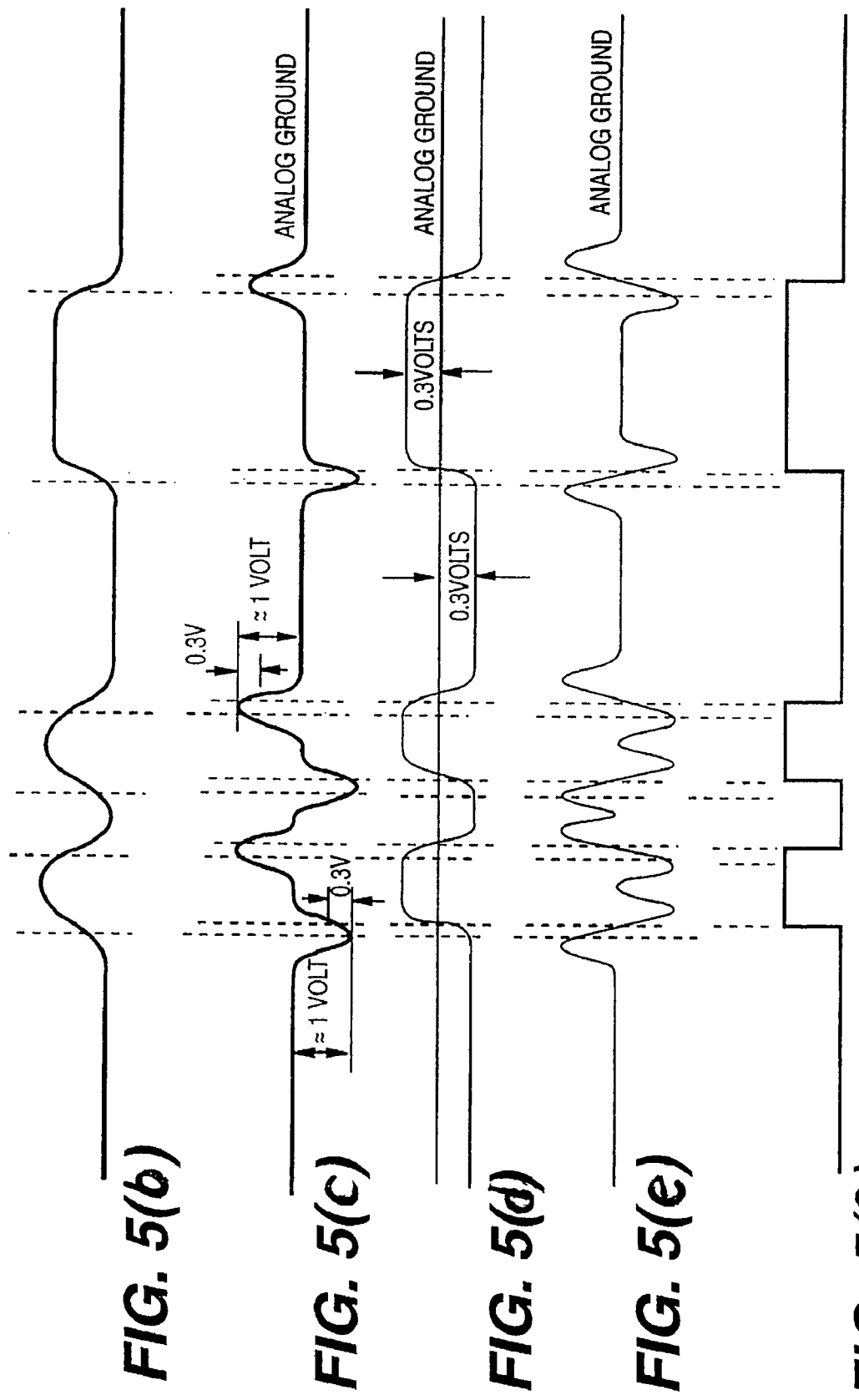

MEMS-BASED ELECTRO-OPTICAL READER AND METHOD WITH EXTENDED WORKING RANGE

BACKGROUND OF THE INVENTION

Various electro-optical readers have previously been developed for reading bar code symbols appearing on a label, or on a surface of a target. The bar code symbol itself is a coded pattern of indicia. Generally, the readers electro-optically transform graphic indicia of the symbols into electrical signals, which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size or widths of the bars and spaces, as measured between opposite edges of each element.

Electro-optical readers have been disclosed, for example, in U.S. Pat. No. 4,251,798; U.S. Pat. No. 4,369,361; U.S. Pat. No. 4,387,297; U.S. Pat. No. 4,409,470; U.S. Pat. No. 4,760,248; and U.S. Pat. No. 4,896,026, and generally include a light source consisting of a gas laser or semiconductor laser for emitting a laser beam. The laser beam is optically modified, typically by a focusing optical assembly, to form a beam spot having a certain size or cross-section at a predetermined target location or beam waist. Preferably, the cross-section of the beam spot at the target location approximates the minimum width between symbol regions of different light reflectivity, i.e., the bars and spaces, although the cross-section of the beam spot can be at least three times larger than the minimum width between the symbol regions.

In conventional readers, the laser beam is directed by a scanning component along an outgoing optical path toward a target symbol for reflection therefrom. The reader operates by repetitively scanning the laser beam in a scan pattern, for example, a line or a series of lines across the target symbol by movement of the scanning component, such as a scan mirror, disposed in the path of the laser beam. The scanning component may sweep the beam spot across the symbol, trace a scan line across and beyond the boundaries of the symbol, and/or scan a predetermined field of view.

Readers also include a photodetector, which functions to detect laser light reflected or scattered from the symbol. In some systems, the photodetector is positioned in the reader in a return path so that it has a field of view, which extends at least across and slightly beyond the boundaries of the symbol. A portion of the laser beam reflected from the symbol is detected and converted into an analog electrical signal. A digitizer digitizes the analog signal. The digitized signal from the digitizer is then decoded by a decoder, based upon the specific symbology used for the symbol, into a binary data representation of the data encoded in the symbol. The binary data may then be subsequently converted into the alphanumeric characters represented by the symbol.

Many applications call for a hand-held reader where a user aims the laser beam at the symbol, and the beam executes a scan pattern to read the symbol. For such applications, the arrangement of electro-optical components must be compact in order to be accommodated in a hand-held package, which may be pistol-shaped. Moreover, such readers must be lightweight and structurally robust to withstand physical shock resulting from rough handling. It is also desirable that minimal power be consumed during operation to promote on-board battery usage.

Overall performance of the reader for reading symbols is a function of the optical components which direct the laser beam at the target symbol and which collect the reflected light, and a function of the electronic components which convert and process the information contained in the reflected light. A measure of the overall performance of the reader is its ability to resolve the narrowest elements of the symbol and its ability to successfully decode symbols located both close-up and far-away from the reader, also known as the working range.

The scan pattern over the symbol can take a variety of forms, such as a repeated line scan, a standard raster scan, a jittered raster scan, a fishbone scan, a petal scan, etc. These patterns are generated by controlled motions of the scan mirror oscillated by some form of motor drive to periodically deflect the beam through the desired pattern. For a repeated beam pattern, a polygonal mirror is unidirectionally rotated by a simple motor. The more times a symbol can be scanned in a given time period, the greater the chances of obtaining a valid read of the symbol.

It is known, for example, in U.S. Pat. No. 6,155,490; U.S. Pat. No. 6,616,046; and U.S. Pat. No. 7,007,843 to use microelectromechanical systems (MEMS) technology to eliminate macroscopic mechanical and electronic components and to replace them with miniature scan elements or mirrors to sweep the laser beam across the indicia to be electro-optically read. These MEMS-based systems are generally fabricated using integrated circuit fabrication techniques or similar techniques such as surface micromachining or bulk micromachining. A common material used is polycrystalline silicon (polysilicon).

Nevertheless, there are drawbacks concerning current implementations of readers utilizing MEMS scan mirrors. The MEMS-based reader is constrained to use a staring collection system, i.e., a non-retro-collection system, in which the photodetector faces or stares at the indicia. To collect sufficient light, the collection system must have a relatively large light detection area. However, a large light detection area for the collection system tends to be more sensitive to ambient light because the collection system will have a relatively larger field of view, which must be large enough to see the entire scan line, as opposed to retro-collection systems where the field of view needs only be large enough to see a small area around the moving beam spot. Ambient light, however, creates noise that limits the working range.

Also, current implementations of the collection systems of MEMS-based readers tend to produce analog electrical signals from the photodetectors of relatively poor signal quality as compared, for example, to retro-collective systems. The lack of adequate laser power safeguards forces some readers to emit laser beams of lower output power which, in turn, decreases the magnitude of the analog electrical signals from the photodetectors. These factors also contribute to limiting the working range.

SUMMARY OF THE INVENTION

One feature of this invention resides, briefly stated, in a reader for, and a method of, electro-optically reading indicia such as bar code symbols located in a range of working distances from the reader, the symbols having bars and spaces of different light reflectivity, each bar and space having widths between respective edges. The reader includes a light source, preferably a laser, for generating a light beam, and a focusing lens to modify the light beam to have a beam spot in cross-section at a beam waist located within the range of working distances.

The reader also includes an oscillatable microelectromechanical systems (MEMS) scan mirror having a reflecting surface area for directing the light beam from the light source along an outgoing path, and for scanning the beam spot over the symbols for reflection therefrom. A photodetector having a light detection area is operative for detecting the light reflected from the symbols, and for generating an electrical analog signal indicative of the reflected light.

In accordance with one feature of this invention, a digitizer is provided for resolving the edges of the bars and spaces of the symbols even when the widths of the bars and spaces are smaller than the beam spot at far-away distances from the reader within the working distance range. The digitizer includes a differentiator for differentiating the analog signal to generate a first derivative signal, a peak detector for detecting voltage peaks in the first derivative signal, and a comparator for comparing voltage drops after the voltage peaks with a predetermined voltage value, and for determining the presence of each edge when each voltage drop at least equals, and preferably exceeds, the predetermined value. The digitizer includes a clamping circuit having diodes for establishing the predetermined voltage value.

In a preferred embodiment, a collector is provided for collecting the light reflected from the symbols along the return path. The collector has a collection aperture area larger than the reflecting surface area of the MEMS mirror and is positioned upstream of the MEMS mirror as considered along the return path, for collecting a major portion of the light reflected from the symbols. Preferably, the collector is a solid block of light-transmissive material extending along the return path to the photodetector to constitute a non-imaging collector. In the case where the light source is a laser for emitting the light beam as a laser beam having a spectral region, the solid block of material is transmissive to the spectral region of the laser beam. The solid block of material advantageously has a cross-sectional dimension that converges from the larger collection aperture area to the smaller light detection area. Alternatively, the collector may be a toroidal lens for imaging the symbols on the light detection area.

In accordance with another feature of this invention, a variable filter is provided for filtering at least one of the analog signal and the first derivative signal, the filter having an adjustable cut-off frequency.

The method of electro-optically reading symbols located in a range of working distances includes the steps of generating and optically modifying a light beam to have a beam spot in cross-section at a beam waist within the range of working distances, directing the light beam along an outgoing path with an oscillatable microelectromechanical systems (MEMS) scan mirror, and scanning the beam spot over the symbols for reflection as light of variable intensity therefrom. The symbols have bars and spaces of different light reflectivity. Each bar and space has widths between respective edges.

The method includes the steps of detecting, and generating an electrical analog signal indicative of, the light of variable intensity with a photodetector; and resolving the edges even when the widths of the bars and spaces are smaller than the beam spot at far-away distances within the working range, by differentiating the analog signal to generate a first derivative signal, by detecting voltage peaks in the first derivative signal, by comparing voltage drops after the voltage peaks with a predetermined voltage value, and by determining the presence of each edge when each voltage drop at least equals, and preferably exceeds, the predetermined voltage value.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 5(b)-5(f) are a set of waveforms to assist in understanding the operation of the digitizer of FIG. 5(a).

DETAILED DESCRIPTION OF THE PREFERRED EMBODIMENTS

Figure 1:
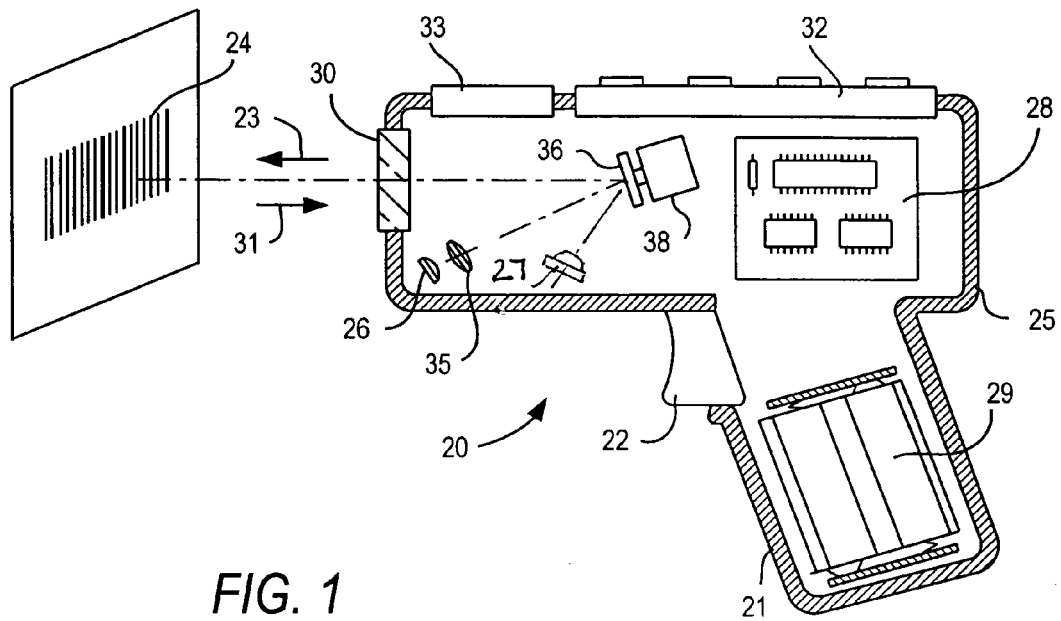
FIG. 1 is a schematic diagram of a hand-held, non-MEMS-based, retro-collective reader for reading a bar code symbol in accordance with the prior art.

Reference numeral 20 in FIG. 1 generally identifies a hand-held, non-MEMS-based, retro-collective reader for electro-optically reading indicia, such as a bar code symbol 24, located in a range of working distances therefrom. The reader 20 has a pistol grip handle 21 and a manually actuatable trigger 22, which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 of variable intensity scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits the light beam 23, which is optically modified and focused by focusing optics 35 to form a beam spot in cross-section on the symbol 24. The beam travels to a scan mirror 36 which is repetitively oscillated at a scan rate of at least 20 scans a second by a motor drive 38. The scan mirror 36 reflects the beam spot incident thereon along an outgoing optical path to the symbol 24 for reflection therefrom and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 along a return path coincident with the outgoing path onto the scan mirror 36 where it is reflected to the photodetector 27 for conversion to an analog electrical signal. The signal processing circuitry 28 includes a digitizer and a decoder, both operating under the control of a controller or microprocessor, to process the signal and extract the data encoded in the symbol.

Figure 2:
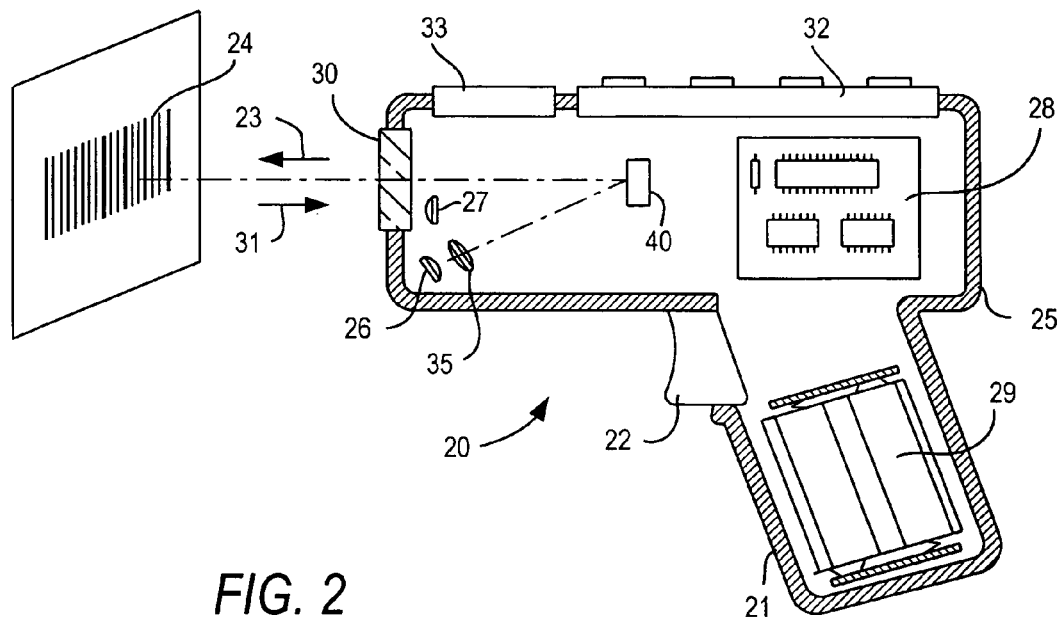
FIG. 2 is a schematic diagram of a hand-held, MEMS-based, non-retro-collective reader for reading a bar code symbol in accordance with the prior art.

FIG. 2 is identical to FIG. 1, except in the following respects. A micro-electromechanical systems (MEMS) component 40 is positioned in the outgoing path of the light beam and replaces the larger scan mirror 36 and the motor drive circuit 38. The component 40 has an outer reflecting surface and, hence, serves as a scan mirror for reflecting the incident light beam focused by the focusing optics 35 toward the symbol 24. Due to the miniature size of the MEMS mirror 40, it cannot reliably serve as a collector and, hence, the photodetector 27 is moved to face the window 30 and, in effect, "stare" at the symbol. FIG. 2 generally illustrates a hand-held, MEMS-based, non-retro-collective reader.

The MEMS mirror 40 can be made to resonate at a desired frequency, either in one direction or in two directions. The resonant frequency may be induced electronically or mechanically. The MEMS mirror 40 preferably has a polished or highly reflective surface such as a silvered surface. The mirrored surface may be a 1.5 mm diameter silvered circular surface and an applied drive voltage may be in the 12 volt range that would result in oscillations of approximately 500 Hz by 10 Hz.

Figure 3:
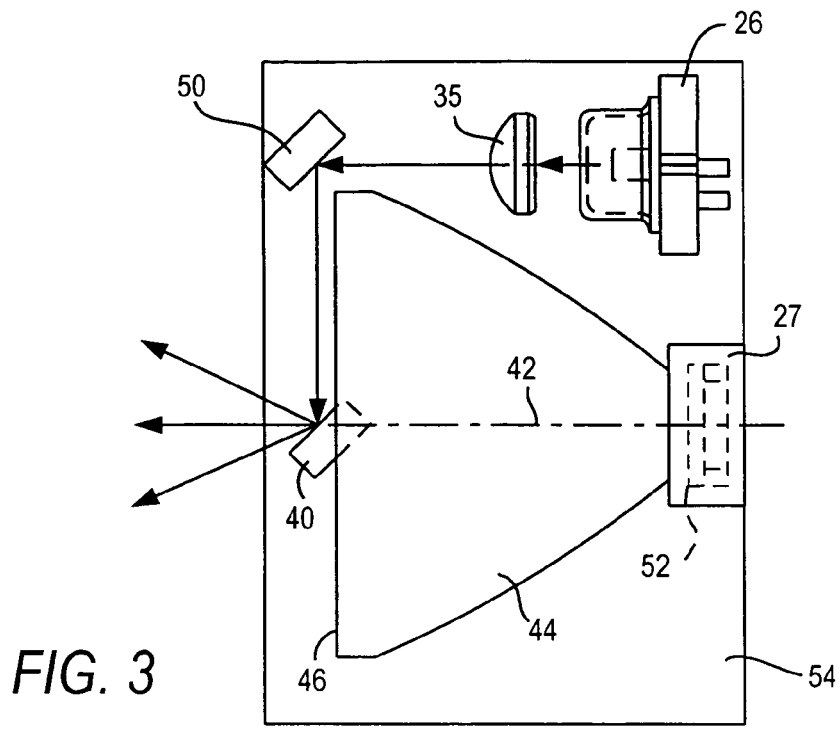
FIG. 3 is an enlarged top plan view of one embodiment of an arrangement for increasing the range of working distances for use in the reader of FIG. 2.
Figure 4:
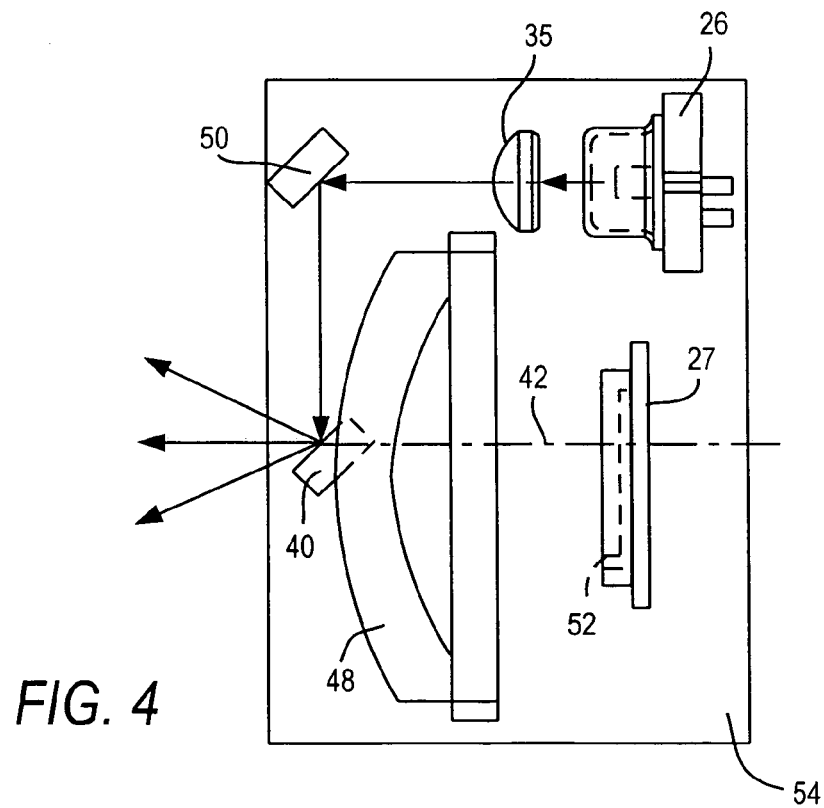
FIG. 4 is an enlarged top plan view of another embodiment of an arrangement for increasing the range of working distances for use in the reader of FIG. 2.

As shown in FIGS. 3 and 4, the same reference numerals have been used to identify the light source 26, preferably a laser diode for emitting a laser beam in the red spectral region having a center wavelength of about 650 nm, the focusing optics 35, the MEMS mirror 40, and the photodetector 27. The photodetector has a field of view preferably centered on the return path that extends along a return axis 42.

A MEMS-based reader designed to operate over an extended working range needs, among other things, a large collection aperture to compensate for less return light incident on a smaller light detection area for the photodetector. A large collection aperture is implemented in FIG. 3 as a non-imaging (non-focusing) collector 44 having a large collection aperture 46 mounted in front of the photodetector 27. The collector 44 is a solid block of material, preferably of plastic, transmissive to the red spectral region. A large collection aperture is implemented in FIG. 4 as a toroidal focusing lens 48 mounted in front of the photodetector 27.

The MEMS mirror 40 is positioned directly in front of the collection aperture, preferably centrally and symmetrically on the return axis 42. Due to the large area of the collection aperture, as compared to the smaller reflective surface area of the MEMS mirror, the MEMS mirror will not block the majority of the return light incident on the collector. Preferably, the MEMS mirror will be positioned at 45 degrees with respect to the plane of the collection aperture, and the outgoing laser beam will be centered along the optical axis which is coaxial with the return axis 42, thereby reducing parallax. A fold mirror 50 is positioned between the optics 35 and the MEMS mirror for a compact configuration.

The MEMS mirror may be positioned slightly off center with respect to the collection aperture and still reduce parallax to a great extent. Electrical connections to the MEMS mirror can be made via thin wires that do not block much light. The wires can be part of a thin flex circuit designed to cover a minimum percentage of the collection aperture area. Positioning the MEMS mirror closer to the edge of the collector minimizes how much light is blocked by the wires.

The MEMS mirror may be mounted directly on the collector. An optical filter may be needed in front of the collector, in which case, the MEMS mirror may be mounted on the optical filter. The photodetector 27 has a light detection area 52 smaller than the collection aperture 46. The collector 44 has a cross-sectional dimension that converges from the larger collection aperture 46 to the smaller light detection area 52. All of the components illustrated in FIGS. 3-4 are mounted on a support, such as a printed circuit board 54, and constitutes a module for easy assembly in the reader.

Figure 5A:
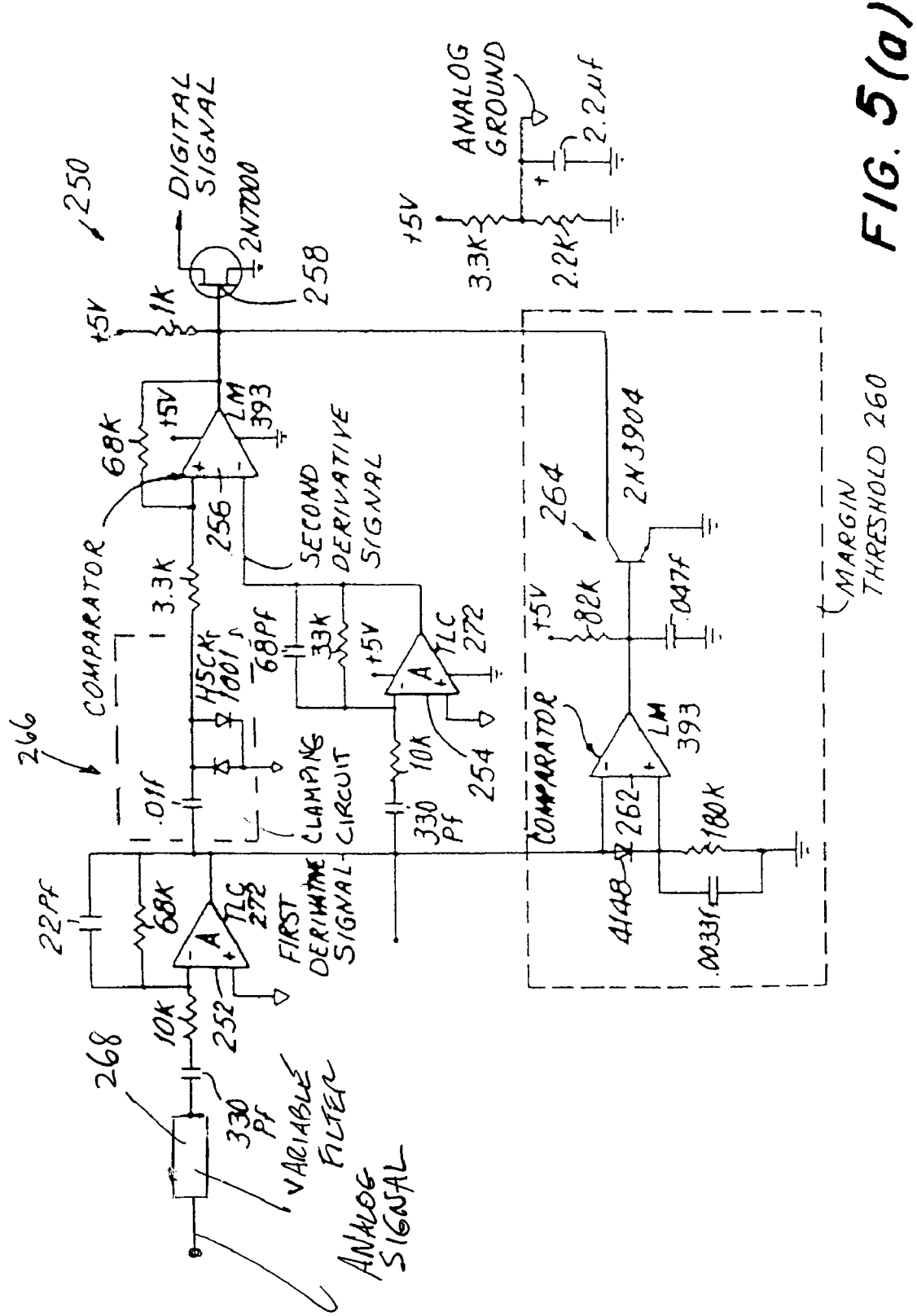
FIG. 5(a) is an electrical schematic of a circuit for a digitizer for increasing the range of working distances for use in the reader of FIG. 2.

In accordance with one feature of this invention, the working range of the MEMS-based reader is further increased by employing a digitizer, such as depicted in FIG. 5(a), capable of resolving edges of the bars and spaces of a symbol, even when the bars and spaces are small with respect to the beam spot or cross-section of the laser beam 23. This typically occurs when the symbol is positioned far away from the reader, i.e., from the waist at which the laser beam is focused. The digitizer 250 provides good digitizing accuracy even when the reading beam spot is much larger than the narrowest bars or spaces in the symbol being scanned. This makes it particularly good for use in long-range readers for reading very high-density symbols, or readers that are to be used where a large depth of focus is important. The digitizer 250 also provides excellent immunity to high levels of ambient light, including sunlight.

In FIG. 5(a), the analog signal from the photodetector 27 is initially conducted to a first operational amplifier 252, preferably positioned early in a chain of amplifiers, configured as a differentiator to generate a first derivative signal. A second operational amplifier 254 configured as a differentiator is operative to generate a second derivative signal. A passive differentiator could be used here for simplicity. The first derivative signal is conducted through a clamping circuit 266 to one input of a comparator 256 whose digital output is conducted to a transistor 258. The second derivative signal is conducted to another input of the comparator 256. A margin threshold subcircuit 260 includes a comparator 262, one input of which is supplied with the first derivative signal, and the other input of which is grounded. The output of comparator 262 is conducted to the base of a transistor 264 whose collector is connected to the output of the comparator 256. The clamping circuit 266 includes a capacitor and a pair of back-to-back clamping diodes (HSCK 1001, for example), which clamps the first derivative signal to a set voltage above and below the analog ground (0.3 volt, for example).

A set of waveforms corresponding to various points in the circuit of FIG. 5(a) is shown in FIGS. 5(b)-5(f). FIG. 5(b) shows the analog signal corresponding to the bar code symbol. The analog signal is applied to the operational amplifier 252 and converted to the first derivative signal, as shown in the waveform of FIG. 5(c). The first derivative signal is applied to the operational amplifier 254 to generate a second derivative signal of the analog signal, as shown in the waveform of FIG. 5(e). FIG. 5(d) shows the waveform produced from the clamping circuit 266 which is applied to the non-inverting input of the comparator 256. The second derivative signal from the operational amplifier 254 is applied to the inverting input of the comparator 256. FIG. 5(f) shows the output of the comparator 256.

The digitizer 250 locates an edge of a bar or a space by detecting when a peak of the first derivative signal has occurred, and then decreased in amplitude by a predetermined voltage, e.g., 0.3 volts, as shown in FIG. 5(c). If the voltage after a peak does not decrease enough, then that peak is considered to be noise, and an edge is not indicated. Only a peak that decreases in voltage adequately afterwards is considered to indicate a real edge of a bar or a space.

Another way to increase the working range is to include a variable filter 268 in the signal path, as shown in FIG. 5(a). This can be an analog filter that is switched on when necessary, or it can be a switched capacitor filter, or a digital filter if the analog signal is sampled. The variable filter 268 can be applied to the analog signal, or to its first derivative signal.

The analog signal becomes noisier as the distance from the reader increases. The beam spot also grows as the distance from the reader increases. Hence, the reader typically can only resolve low density symbols at far-away distances from the reader. These low density symbols produce a lower signal frequency as compared to high density symbols when read up close to the reader. Hence, the bandwidth can be reduced to minimize noise when reading low density symbols at a far distance. If the bandwidth is not reduced, then the signal can become too noisy to decode at ranges where the beam spot is still small enough to resolve all the bars and spaces. The filter 268 is advantageously set to a low cut-off frequency when scanning low density symbols far away, and to a higher cut-off frequency when scanning high density symbols close up to the reader where the noise is less.

It will be understood that each of the elements described above, or two or more together, also may find a useful application in other types of constructions differing from the types described above.

While the invention has been illustrated and described as embodied in a MEMS-based electro-optical reader and method with an extended working range, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A reader for electro-optically reading symbols located in a range of working distances from the reader, the symbols having bars and spaces of different light reflectivity, each bar and space having widths between respective edges, comprising:
    means for generating and optically modifying a light beam to have a beam spot in cross-section at a beam waist within the range of working distances;
    an oscillatable microelectromechanical systems (MEMS) scan mirror having a reflecting surface area for directing the light beam along an outgoing path, and for scanning the beam spot over the symbols for reflection as return light of variable intensity therefrom;
    a non-retro-reflective collection system for detecting, and for generating an electrical analog signal indicative of, the return light, the system including a photodetector directly facing the symbols, and a collector having a collection aperture area larger than the reflecting surface area for directly collecting and directing a major portion of the return light along a return path to the photodetector, the MEMS mirror being located in the return path and blocking only a minor portion of the return light en route to the photodetector; and
    a digitizer for resolving the edges even when the widths of the bars and spaces are smaller than the beam spot at far-away distances from the reader within the range of working distances, the digitizer including a differentiator for differentiating the analog signal to generate a first derivative signal, a peak detector for detecting voltage peaks in the first derivative signal, and a comparator for comparing voltage drops after the voltage peaks with a predetermined voltage value, and for determining the presence of each edge when each voltage drop at least equals the predetermined voltage value.

2. The reader of claim 1, wherein the collector is a solid block of light-transmissive material extending along the return path to the photodetector to constitute a non-imaging collector.

3. The reader of claim 2, wherein the light beam generating means includes a laser for emitting the light beam as a laser beam having a spectral region, and wherein the solid block of material is transmissive to the spectral region of the laser beam.

4. The reader of claim 2, wherein the solid block of material has a cross-sectional dimension that converges from the larger collection aperture area to the light detection area.

5. The reader of claim 1, wherein the collector is a toroidal lens for imaging the symbols on the light detection area.

6. The reader of claim 1, wherein the light beam modifying means includes a focusing lens for focusing the light beam, and a fold mirror for directing the light beam focused by the focusing lens to the MEMS mirror.

7. The reader of claim 1, wherein the digitizer includes a clamping circuit having diodes for establishing the predetermined voltage value.

8. The reader of claim 1, and a variable filter for filtering at least one of the analog signal and the first derivative signal, the filter having an adjustable cut-off frequency.

9. A method of electro-optically reading symbols located in a range of working distances, the symbols having bars and spaces of different light reflectivity, each bar and space having widths between respective edges, the method comprising the steps of:
    generating and optically modifying a light beam to have a beam spot in cross-section at a beam waist within the range of working distances;
    directing the light beam along an outgoing path with an oscillatable microelectromechanical systems (MEMS) scan mirror having a reflecting surface area, and scanning the beam spot over the symbols for reflection as return light of variable intensity therefrom;
    detecting, and generating an electrical analog signal indicative of, the return light with a non-retro-reflective collection system having a photodetector directly facing the symbols, and a collector having a collection aperture area larger than the reflecting surface area for directly collecting and directing a major portion of the return light along a return path to the photodetector, the MEMS mirror being located in the return path and blocking only a minor portion of the return light en route to the photodetector; and
    resolving the edges even when the widths of the bars and spaces are smaller than the beam spot at far-away distances within the range of working distances, by differentiating the analog signal to generate a first derivative signal, by detecting voltage peaks in the first derivative signal, by comparing voltage drops after the voltage peaks with a predetermined voltage value, and by determining the presence of each edge when each voltage drop at least equals the predetermined voltage value.

10. The method of claim 9, and the step of forming the collector as a solid block of light-transmissive material extending along the return path to the photodetector to constitute a non-imaging collector.

11. The method of claim 10, wherein the generating step is performed by a laser for emitting the light beam as a laser beam having a spectral region, and the step of forming the solid block of material to be transmissive to the spectral region of the laser beam.

12. The method of claim 10, and the step of forming the solid block of material with a cross-sectional dimension that converges from the larger collection aperture area to the light detection area.

13. The method of claim 9, and the step of forming the collector as a toroidal lens for imaging the symbols on the light detection area.

14. The method of claim 9, and the steps of focusing the light beam, and directing the focused light beam to the MEMS mirror.

15. The method of claim 9, and the step of establishing the predetermined voltage value with diodes.

16. The method of claim 9, and the step of filtering at least one of the analog signal and the first derivative signal with a filter, and the step of adjusting a cut-off frequency of the filter.

* * * * *